US010298874B1

(12) United States Patent
Lewis et al.

(10) Patent No.: US 10,298,874 B1
(45) Date of Patent: May 21, 2019

(54) AUTOMATICALLY PLAYING PARTIALLY VISIBLE VIDEOS

(71) Applicant: GOOGLE LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 572 days.

(21) Appl. No.: 14/957,315

(22) Filed: Dec. 2, 2015

(51) Int. Cl.
| | |
|---|---|
| G06F 3/00 | (2006.01) |
| G06F 9/00 | (2006.01) |
| G06F 17/00 | (2006.01) |
| H04N 5/445 | (2011.01) |
| G06F 3/0485 | (2013.01) |
| G06F 3/0482 | (2013.01) |
| G06F 3/0484 | (2013.01) |

(52) U.S. Cl.
CPC ....... *H04N 5/44591* (2013.01); *G06F 3/0482* (2013.01); *G06F 3/0485* (2013.01); *G06F 3/04842* (2013.01)

(58) Field of Classification Search
CPC ........ G06F 9/4443; G06F 8/34; G06F 3/0486; G06F 8/38; G06F 3/0481; G06F 3/0482; G06F 3/04842; G06F 3/0485; H04N 1/00183; H04N 5/44591; H04N 1/00389; H04N 1/00411
See application file for complete search history.

(56) References Cited

U.S. PATENT DOCUMENTS

| | | | | |
|---|---|---|---|---|
| 8,490,132 | B1 * | 7/2013 | Shi ........................ | G06Q 30/02 348/14.01 |
| 8,554,681 | B1 * | 10/2013 | Wieder .................. | G06F 21/10 705/51 |
| 9,098,681 | B2 * | 8/2015 | Wieder ................. | H04L 67/306 |
| 2008/0172693 | A1 * | 7/2008 | Ludvig .............. | H04N 5/44591 725/40 |
| 2014/0189524 | A1 * | 7/2014 | Murarka ................ | G06Q 50/01 715/744 |
| 2014/0368734 | A1 * | 12/2014 | Hoffert .............. | H04N 5/44591 348/564 |

OTHER PUBLICATIONS

Aarki, "Video Carousel Ads", http://www.aarki.com/pr/video-carousel-significantly-expands-the-native-experience-in-mobile-ads, launched in Apr. 2015, 2 pages.
Facebook, "Video Carousel Ads", downloaded on Mar. 28, 2016, 1 page.
Instagram, "Video Carousel Ads", downloaded on Mar. 28, 2016, 1 page.

* cited by examiner

*Primary Examiner* — Kieu D Vu
*Assistant Examiner* — Anita D. Chaudhuri
(74) *Attorney, Agent, or Firm* — Foley & Lardner LLP

(57) ABSTRACT

A user device receives a plurality of content items that include a plurality of videos for presentation to a user of the user device, and renders a user interface on the user device. The user interface includes a first video of the plurality of content items that is being played concurrently with a second video of the plurality of videos. The second video is playing while being partially visible in the user interface.

20 Claims, 12 Drawing Sheets

US 10,298,874 B1

AUTOMATICALLY PLAYING PARTIALLY VISIBLE VIDEOS

TECHNICAL FIELD

Aspects and implementations of the present disclosure relate to presenting videos, and more specifically, to automatically playing partially visible videos.

BACKGROUND

Videos can be played on a display of a user device one at a time. A user may be watching a first video and an application may not play another video until the first video has stopped playing, which may cause a delay between videos being played. Some applications present videos as a carousel (a scrollable set of multiple videos) that can be scrolled through by a user (e.g., by activating a scroll button or via a swiping gesture). Applications typically do not start playing a video contained within the carousel until the video is fully visible on the display of a user device.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device of a user device receives a plurality of content items comprising a plurality of videos for presentation to a user of the user device and renders a user interface on the user device. The user interface includes a first video of the plurality of content items that is being played concurrently with a second video of the plurality of content items. The second video is playing while being partially visible in the user interface.

In one implementation, the plurality of content items is displayed in a content feed in the user interface, the content feed being scrollable in a first direction parallel to an orientation of the user device, and the plurality of content items being scrollable in the content feed in a second direction that is perpendicular to the first direction of the content feed. In one implementation, the first video is playing while being fully visible in the user interface. In one implementation, the first video is playing while being partially visible in the user interface.

In one implementation, the processing device is further to render the user interface on the user device with an additional video of the plurality of content items. The additional video is playing while being partially visible in the user interface and concurrently with at least one of the first video playing in the user interface or the second video playing in the user interface.

In one implementation, audio of the second video that is playing while being partially visible in the user interface is disabled and audio of the first video that is concurrently playing in the user interface is enabled. In one implementation, the playing of the second video that is partially visible in the user interface is triggered based on the first video. In one implementation, at least one video in the plurality of content items is a video advertisement for which an advertiser is to be charged.

In one implementation, the processing device is further to determine that a consumption time of the first video that is playing in the user interface does not satisfy a threshold. The first video is associated with a content provider. The processing device is further to determine a consumption time of at least one other video that is associated with the same content provider, determine that a cumulative consumption time of the first video and the at least one other video satisfies the threshold, and determine a content provider fee for the content provider based on the cumulative consumption time. In one implementation, to determine a consumption time of the at least one other video that is associated with the same content provider, the processing device is to select the at least one other video that is associated with the same content provider from a different plurality of content items.

An apparatus to automatically play partially visible videos is also described. In one implementation, the apparatus includes means for receiving a plurality of content items comprising a plurality of videos for presentation to a user of the user device and means for rendering a user interface on the user device. The user interface includes a first video of the plurality of content items that is being played concurrently with a second video of the plurality of content items. The second video is playing while being partially visible in the user interface.

In one implementation, the apparatus includes means for displaying the plurality of content items in a content feed in the user interface, the content feed being scrollable in a first direction parallel to an orientation of the user device, and the plurality of content items being scrollable in the content feed in a second direction that is perpendicular to the first direction of the content feed. In one implementation, the apparatus includes means for playing the first video while being fully visible in the user interface. In one implementation, the apparatus includes means for playing the first video while being partially visible in the user interface.

In one implementation, the apparatus further includes means for rendering the user interface on the user device with an additional video of the plurality of content items. The additional video is playing while being partially visible in the user interface and concurrently with at least one of the first video playing in the user interface or the second video playing in the user interface.

In one implementation, audio of the second video that is playing while being partially visible in the user interface is disabled and audio of the first video that is concurrently playing in the user interface is enabled. In one implementation, the playing of the second video that is partially visible in the user interface is triggered based on the first video. In one implementation, at least one video in the plurality of content items is a video advertisement for which an advertiser can be charged for.

In one implementation, the apparatus further includes means for determining that a consumption time of the first video that is playing in the user interface does not satisfy a threshold. The first video is associated with a content provider. The apparatus further includes means for determining a consumption time of at least one other video that is associated with the same content provider, means for determining that a cumulative consumption time of the first video and the at least one other video satisfies the threshold, and means for determining a content provider fee for the content provider based on the cumulative consumption time. In one implementation, the apparatus further includes means for determining a consumption time of the at least one other video that is associated with the same content provider, and means for selecting the at least one other video that is associated with the same content provider from a different plurality of content items.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to auto-play of partially visible videos. Traditional applications typically play videos on a display of a user device one at a time. A user may be watching a first video and an application may not play another video until the first video has stopped playing, which may cause a delay between videos being played. Traditional applications typically also do not start playing a video until the video is fully visible on the display of the user device. As such, there is generally a delay in starting the playing of a video while the application is waiting for the video to become fully visible on the display. Aspects of the present disclosure can reduce such a delay by providing auto-play of partially visible videos. Auto-playing a video refers to starting the playback of a video by a user device without receiving a user request to play the video (e.g., starting the playback of a video responsive to a trigger other than such a user request).

Figure 1:
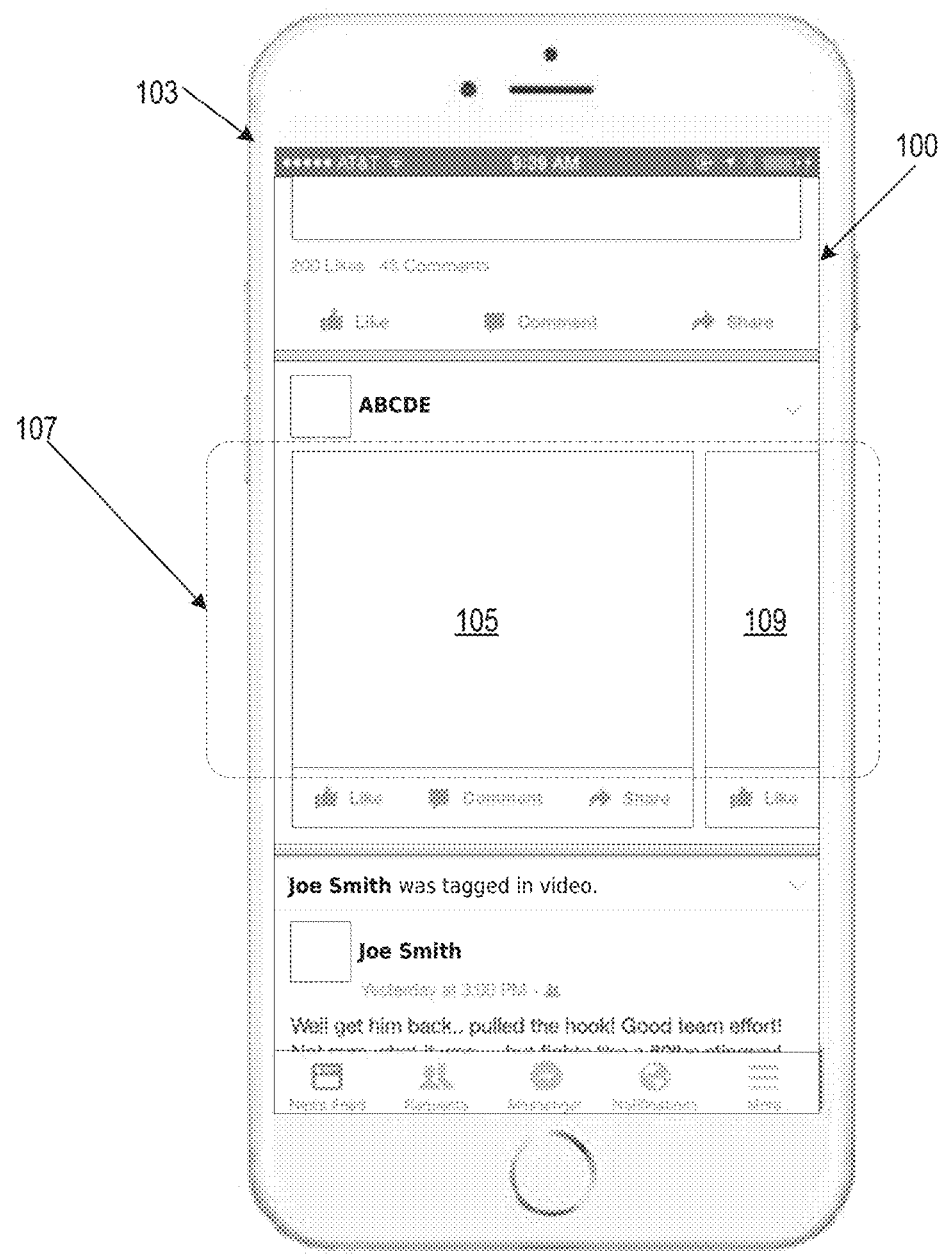
FIG. 1 depicts an example scrollable set of content items, in accordance with one implementation of the present disclosure.

In one implementation, the partially visible videos are part of a scrollable set of content items. A scrollable set of content items can include a group of videos, which when presented in a graphical user interface (GUI) of an application executing on a user device, can be scrolled through by a user (e.g., by activating a scroll button or via a swiping gesture). FIG. 1 depicts an example scrollable set of content items, in accordance with one implementation of the present disclosure. A user interface 100 of an application can be rendered on user device (e.g., a mobile phone) 103. For example, the application may be a social network application. The user interface 100 can include a scrollable set of content items 107 that includes video 105 and video 109. Video 105 and video 109 may be video advertisements from the same advertiser or from different advertisers. A user can swipe the touch screen of the user device 103, for example, from right to left, to scroll through the scrollable set of content items 107. One of the videos in the scrollable set of content items can be fully visible in the user interface while one or more videos of the set of content items can be partially visible in the user interface. For example, video 105 may be fully visible in the user interface 100, while video 109 may be partially visible in the user interface 100. A user may swipe the user interface 100, for example, from right to left, and video 105 may be no longer visible in the user interface 100, video 109 may transition from a partially visible video to a fully visible video, and another video in the scrollable set of content items 107 may be presented as a new partially visible video in the user interface 100.

Unlike traditional solutions that wait for a video to be fully visible in a user interface before playing the video, aspects of the present disclosure can play a video (e.g., video 109) while the video is partially visible in the user interface. In some implementations, a partially visible video (e.g., video 109) can start playing without waiting for a previous video (e.g., video 105) to stop playing. As such, implementations of the present disclosure can concurrently play one or more fully visible videos with one or more partially visible videos (e.g., video 109 and video 105) or multiple partially visible videos in the same user interface.

Figure 2:
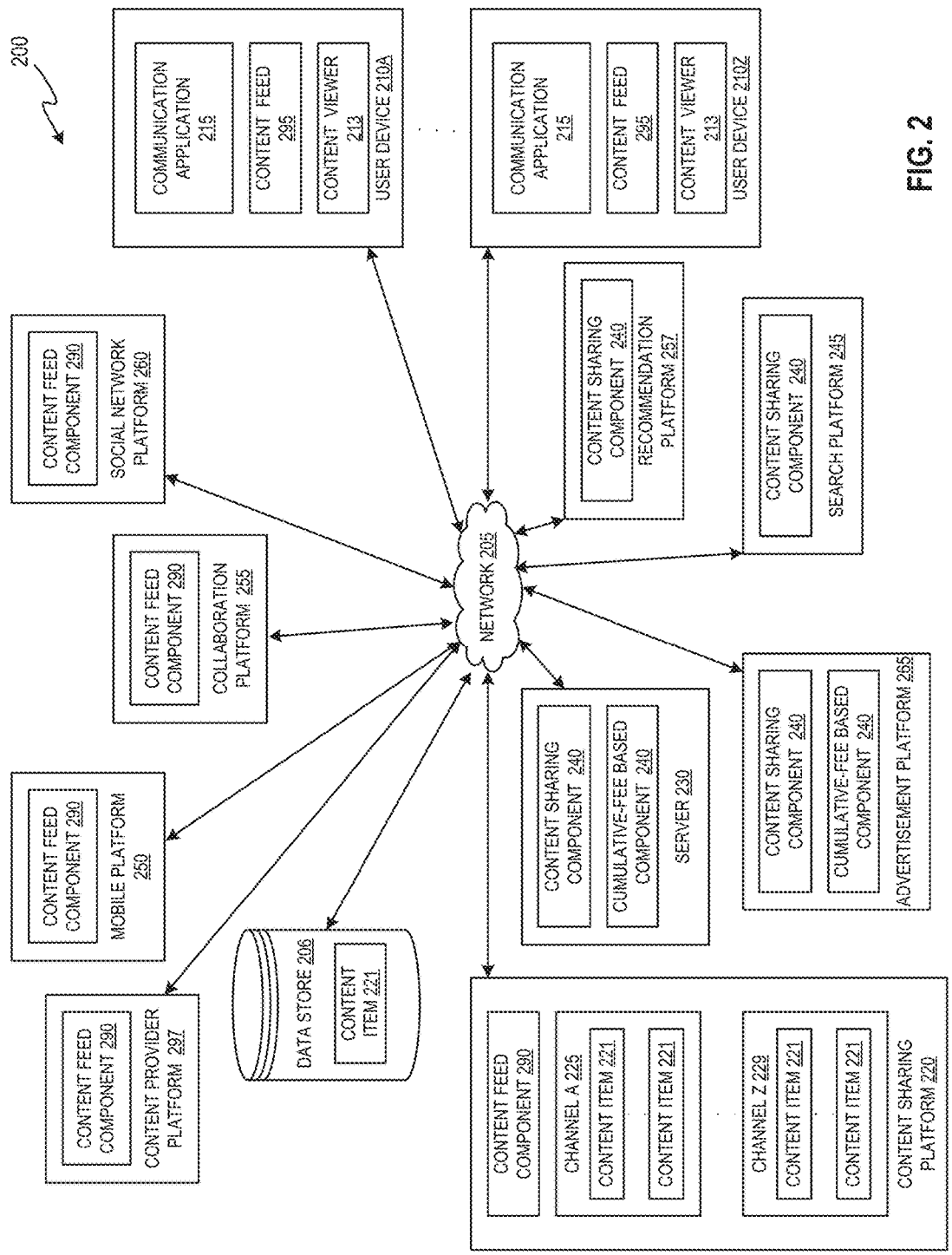
FIG. 2 illustrates an example of system architecture for auto-play of one or more partially visible videos, in accordance with one implementation of the disclosure.

FIG. 2 illustrates an example of system architecture 200 for auto-play of one or more partially visible videos, in accordance with one implementation of the disclosure. The system architecture 200 includes user devices 210A through 210Z, one or more networks 205, one or more data stores 206, one or more servers 230, and one or more platforms (e.g., content sharing platform 220, recommendation platform 257, advertisement platform 265, mobile platform 250, social network platform 260, search platform 245, content provider platform 297, and collaboration platform 255). The user devices 210A through 210Z can be client devices.

The one or more networks 205 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 200 are not directly connected to each other. In one implementation, architecture 200 includes separate networks 205.

The one or more data stores 206 can be memory (e.g., random access memory), cache, drives (e.g., hard drive), flash drives, database systems, or another type of component or device capable of storing data. The one or more data stores 206 can include multiple storage components (e.g., multiple drives or multiple databases) that may also span multiple computing devices (e.g., multiple server computers). The data stores 206 can be persistent storage that are capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Content items 221 can be stored in one or more data stores 206. The data stores 206 can be part of one or more platforms. Examples of a content item 221 can include, and are not limited to, digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. Content item 221 is also referred to as a media item. For brevity and simplicity, an online video (also hereinafter referred to as a video) is used as an example of a content item 221 throughout this document.

The content items 221 can be provided by content providers for storage in one or more data stores 206. A content provider can be a user, a company, an organization, etc. A content provider can provide contents items 221 that are video advertisements. A content provider that provides video advertisements is hereinafter referred to as an advertiser. For example, a content item 221 may be a video advertisement for a car provided by a car advertiser. A service provider (e.g., content sharing platform 220, recommendation platform 257, advertisement platform 265, mobile platform 250, social network platform 260, search platform 245, content provider platform 297, and collaboration platform 255) can charge an advertiser a fee, for example, when the service provider provides the advertisements on user devices 210A-210Z to be viewed by users.

The user devices 210A-210Z can include devices, such as smart phones, cellular telephones, personal digital assistants (PDAs), portable media players, netbooks, laptop computers, electronic book readers, tablet computers, desktop computers, set-top boxes, gaming consoles, televisions, and the like.

The individual user devices 210A-210Z can include a communication application 215. A content item 221 can be consumed via a communication application 215, the Internet, etc. As used herein, "media," "media item," "online media item," "digital media," "digital media item," "content," and "content item" can include an electronic file that can be executed or loaded using software, firmware or hardware configured to present a content item. In one implementation, the communication applications 215 may be applications that allow users to compose, send, and receive content items 221 (e.g., videos) over a platform (e.g., content sharing platform 220, recommendation platform 257, advertisement platform 265, mobile platform 250, social network platform 260, search platform 245, collaboration platform 255, and content provider platform 297) and/or a combination of platforms and/or networks.

For example, the communication application 215 may be a social networking application, video sharing application, photo sharing application, chat application, mobile application of a content provider or any combination of such applications. The communication application 215 in a user device can render, display, and/or present one or more content items 221 (e.g., videos) to one or more users. For example, the communication application 215 can provide one or more user interfaces (e.g., graphical user interfaces) to be rendered in a display of a user device for sending, receiving and/or playing videos.

In one implementation, the individual user devices 210A-210Z includes a content viewer 213 (e.g., media player) to render, display, and/or present content items 221 (e.g., videos) to one or more users. In one implementation, a content viewer 213 is embedded in an application (e.g., communication application 215). For example, for mobile devices, the communication application 215 can be a mobile application that can be downloaded from a platform (e.g., content sharing platform 220, social network platform 260, content provider platform 297, etc.) and can include a content viewer 213 (e.g., media player). In another example, the communication application 215 can be a desktop application, such as a web browser that can access, retrieve, present, and/or navigate content (e.g., web pages such as Hyper Text Markup Language (HTML) pages, digital media items, etc.) served by a web server of a platform. The content viewer 213 can be a web browser plugin or a separate application. In one implementation, the content viewer 213 is embedded in a web page. For example, the content viewer 213 may be an embedded media player (e.g., a Flash® player or an HTML5 player) that is embedded in a document (e.g., a web page).

One or more platforms (e.g., content sharing platform 220, recommendation platform 257, advertisement platform 265, mobile platform 250, social network platform 260, search platform 245, collaboration platform 255, and content provider platform 297) can include a content feed component 290 to provide a content feed 295 to users via communication applications 215 on user devices 210A-210Z. A content feed 295 can be a list of content associated with one or more content providers. The individual content of a content feed is hereinafter referred to as "feed items". The list can be a scrollable list that is updatable to include new items and/or remove old (less recent) items.

The content provider platform 297 can provide a service and the content provider can be the service provider. For example, a content provider may be a streaming service provider that provides a media streaming service via a communication application 215 for users to play TV shows, clips, and movies, on user devices 210A-210Z via the content provider platform 297. The content provider platform 297 can include a content feed component 290 to present a content feed 295 that lists feed items, such as trending television clips, popular television clicks, popular movie trailers, etc. in the user interface of the communication application 215. The content provider platform 297 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide content to users.

The social network platform 260 can provide an online social networking service. The social network platform 260 can provide a communication application 215 for users to create profiles and perform activity with their profile. Activity can include updating a profiling, exchanging messages with other users, posting status updates, photos, videos, etc. to share with other users, evaluating (e.g., like, comment, share, recommend) status updates, photos, videos, etc., and receiving notifications of other users activity. Content providers for a content feed 295 can include users of the social network platform 260 and advertisers providing advertisements on the social network platform 260. The social network platform 260 can include a content feed component 290 to present a content feed 295 that lists feed items, such as, activity (e.g., posted status updates, profile updates, photos being shared, videos being shared), in the user interface of the communication application 215. The social network platform 260 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide communication between users.

The mobile platform 250 can be and/or include one or more computing devices (e.g., servers), data stores, networks (e.g., phone network, cellular network, local area network, the Internet, and/or a combination of networks), software components, and/or hardware components that can be used to allow users to connect to, share information, and/or interact with each other using one or more mobile devices (e.g., phones, tablet computers, laptop computers, wearable computing devices, etc.) and/or any other suitable device. For example, the mobile platform 250 may enable telephony communication, Short Message Service (SMS) messaging, Multimedia Message Service (MMS) messaging, text chat, and/or any other communication between users. The mobile platform 250 can support user communications via video messaging, video chat, and/or videoconferences. Content providers for a content feed 295 can include users of the mobile platform 250 and advertisers providing advertisements on the mobile platform 250. The mobile platform 250 can include a content feed component 290 to present a content feed 295 that lists feed items, such as messages (e.g., text messages, video messages, chat messages), in the user interface of the communication application 215 (e.g., mobile text messaging application, mobile video chat application).

The collaboration platform 255 can enable collaboration services, such as video chat, video messaging, and audio and/or videoconferences (e.g., among the users of devices 210A-210Z) using, for example, streaming video or voice over IP (VoIP) technologies, cellular technologies, LAN and/or WAN technologies, and may be used for personal, entertainment, business, educational or academically oriented interactions. Content providers for a content feed 295 can include users of the collaboration platform 255. Collaboration platform 255 can include a content feed component 290 to provide video conferencing services and to present a content feed 295 that lists feed items, such as content from news services, social networking services and/or content hosting services, in the user interface of the communication application 215. For instance, the collaboration platform 255 can allow a user to view a content feed that includes feed items, such as, news and start a videoconference while viewing the content feed. In another example, the collaboration platform 155 may allow a user to start a videoconference while visiting a social networking site or video content hosting site. The collaboration platform 255 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide communication between users.

The recommendation platform 257 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to generate and provide content recommendations (e.g., articles, videos, posts, news, games, etc.). The recommendation platform 257 can include a content feed component 290 to present a content feed 295 that lists feed items, such as the content recommendations (e.g., recommended videos, articles, links, etc.) in the user interface of the communication application 215.

The search platform 245 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to allow users to query the one or more data stores 206 and/or one or more platforms and receive query results. The search platform 245 can include a content feed component 290 to present a content feed 295 that lists feed items, such as, query results in the user interface of the communication application 215.

The advertisement platform 265 can provide video advertisements. In one implementation, the advertisement platform 265 provides one or more advertisements to the content sharing component 240 and/or one or more platforms (e.g., content sharing platform 220, recommendation platform 257, advertisement platform 265, mobile platform 250, social network platform 260, search platform 245, content provider platform 297, and collaboration platform 255), for presentation, for example, in a content feed 295 via a communication application 215 on a client deice 210A-210Z to a user. The advertisement platform 265 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide the video advertisements. The advertisement platform 265 can include a content feed component 290 to present a content feed 295 that lists feed items, such as, video advertisements in the user interface of the communication application 215.

The content sharing platform 220 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide one or more users with access to content items 221 and/or provide the content items 221 to one or more users. For example, the content sharing platform 220 may allow users to consume, upload, download, and/or search for content items 221. In another example, the content sharing platform 220 may allow users to evaluate content items 221, such as approve of ("like"), dislike, recommend, share, rate, and/or comment on content items 221. In another example, the content sharing platform 220 may allow users to edit content items 221. The content sharing platform 220 can also include a website (e.g., one or more webpages) and/or one or more applications (e.g., communication applications 215) that may be used to provide one or more users with access to the content items 221, for example, via user devices 210A-210Z. Content sharing platform 220 can include any type of content delivery network providing access to content items 221. The content sharing platform 220 can include a content feed component 290 to present a content feed 295 that lists feed items, such as content items 221 in the user interface of the communication application 215.

The content sharing platform 220 can include multiple channels (e.g., Channel A 225 through Channel Z 229). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 225 may include videos Y and Z. A channel can be associated with an owner, who is a user that can perform actions on the channel. The data content can be one or more content items 221.

Different activities can be associated with the channel based on the channel owner's actions, such as the channel owner making digital content available on the channel, the channel owner selecting (e.g., liking) digital content associated with another channel, the channel owner commenting on digital content associated with another channel, etc. The activities associated with the channel can be collected into a content feed 295 for the channel. Users, other than the owner of the channel, can subscribe to one or more channels in which they are interested. Once a user subscribes to a channel, the user can be presented with information from the channel's activity feed. A content feed 295 for a channel can be a list of recent activity associated with the user and occurring on a social network. If a user subscribes to multiple channels, the content feed 295 for each channel to which the user is subscribed can be combined into a syndicated content feed 295. Information from the syndicated content feed 295 can be presented to the user. Although channels are described as one implementation of a content sharing platform, implementations of the disclosure are not limited to content sharing platforms that provide content items 221 via a channel model.

The server 230 can be one or more computing devices (e.g., a rackmount server, a server computer, etc.). In one implementation, the server 230 is included in one or more of the platforms. In another implementation, the server 230 is separate from the platforms, but may communicate (e.g., exchange data) with the one or more platforms.

The server 230 can include a content sharing component 240 for providing scrollable sets of videos (e.g., scrollable set of content items 107 in FIG. 1) to users via communication applications 215. The videos in the scrollable sets of videos can include one or more video advertisements of content providers that are advertisers. The content sharing component 240 can receive the video advertisements and/or identifiers of video advertisements from the advertisement platform 265 and/or one or more other platforms, and provide the video advertisements and/or identifiers of the video advertisements to the communication application 215.

In one implementation, communication application 215 can include the scrollable sets of videos in a content feed 295 in a user interface that is rendered on a user device 210A. The communication application 215 can receive data (e.g., configuration data, feed item identifiers, feed items, content item identifiers, content items, etc.) from a content feed component 290 for presenting a content feed 295 in a user interface on a user device 210A-210Z.

The communication application 215 can automatically play (auto-play) partially visible videos (e.g., partially visible video 109 in FIG. 1) in the scrollable set of content items in a user interface on a user device 210A-210Z. The communication application 215 can automatically play a partially visible video in a scrollable set of content items based on a trigger, as described in greater detail below in conjunction with FIG. 3. For example, a video in a scrollable set of content items may be automatically triggered to play once a portion of the video becomes visible in a user interface.

The server 230 and/or advertisement platform 265 can include a cumulative-based fee component 235 for determining cumulative consumption times of videos of content providers (e.g., advertisers), and determining content provider fees to charge the content providers based on a respective cumulative consumption time. The set of scrollable videos can include one or more video advertisements. For example, a set of scrollable videos may include 5 videos. Three of the videos in the set of scrollable videos may be video advertisements for electric vehicles of content provider (e.g., advertiser) ACME Company. The cumulative-based fee component 235 can determine a consumption time for individual instances of the video advertisements of ACME Company being played, and can use the consumption time for the individual instances of the video advertisements to determine a cumulative consumption time for advertiser ACME Company. The cumulative-based fee component 235 can determine a content provider fee to charge a content provider (e.g., ACME Company) using the cumulative consumption time, as described in greater detail below in conjunction with FIGS. 9-11.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 3:
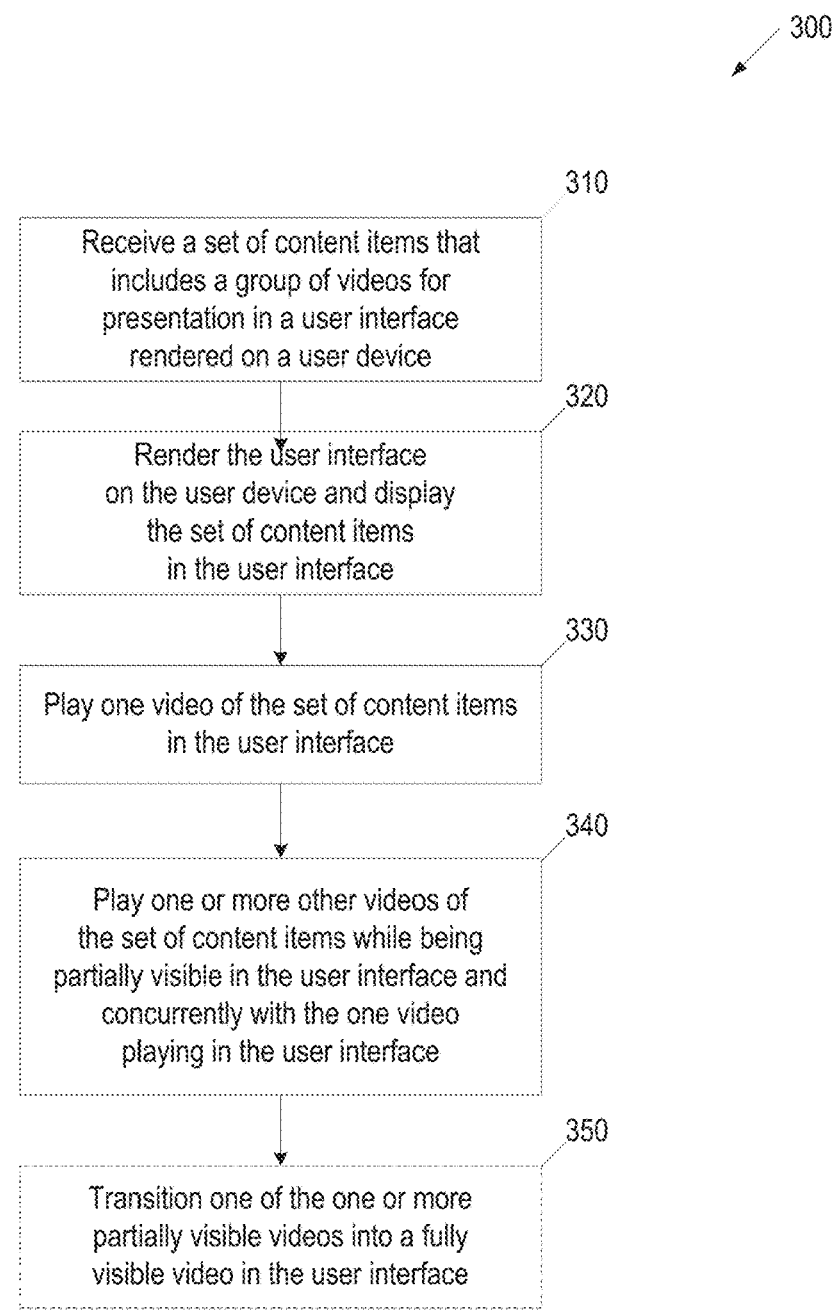
FIG. 3 depicts a flow diagram of aspects of a method for auto-playing one or more partially visible videos concurrently with a video that is playing in a user interface, in accordance with one implementation of the present disclosure.

FIG. 3 depicts a flow diagram of aspects of a method 300 for auto-playing one or more partially visible videos concurrently with a video that is playing in a user interface, in accordance with one implementation of the present disclosure. The method 300 is performed by processing logic that may comprise hardware (circuitry, dedicated logic, etc.), software (such as is run on a general purpose computer system or a dedicated machine), or a combination of both. In one implementation, the method is performed by a communication application 215 in a user device 210A-210Z of FIG. 2, while in some other implementations one or more blocks of FIG. 3 may be performed by another machine. For example, in various alternative implementations, at least a portion of the method 300 can be performed by/at a content sharing component 240 in a server computing machine of FIG. 2. In one implementation, a processing device of a user device (e.g., user device 210A-210Z in FIG. 2) performs method 300.

At block 310, the processing device receives a set of content items that includes a set of videos for presentation in a user interface rendered on a user device. The group of videos can be selected from videos that are provided by content providers. One or more platforms (e.g., content sharing platform 220, recommendation platform 257, advertisement platform 265, mobile platform 250, social network platform 260, search platform 245, collaboration platform 255, and content provider platform 297 in FIG. 2) can select the videos for the set of content items. In one implementation, the one or more platforms can provide the selected videos and/or identifiers of the selected videos to the content sharing component (e.g., content sharing component 240 in FIG. 2), and the content sharing component can send the selected videos and/or identifiers of the selected videos to the communication application on a user device. In one implementation, the one or more platforms can directly provide the selected videos and/or identifiers of the selected videos to the communication application on a user device.

Figure 4:
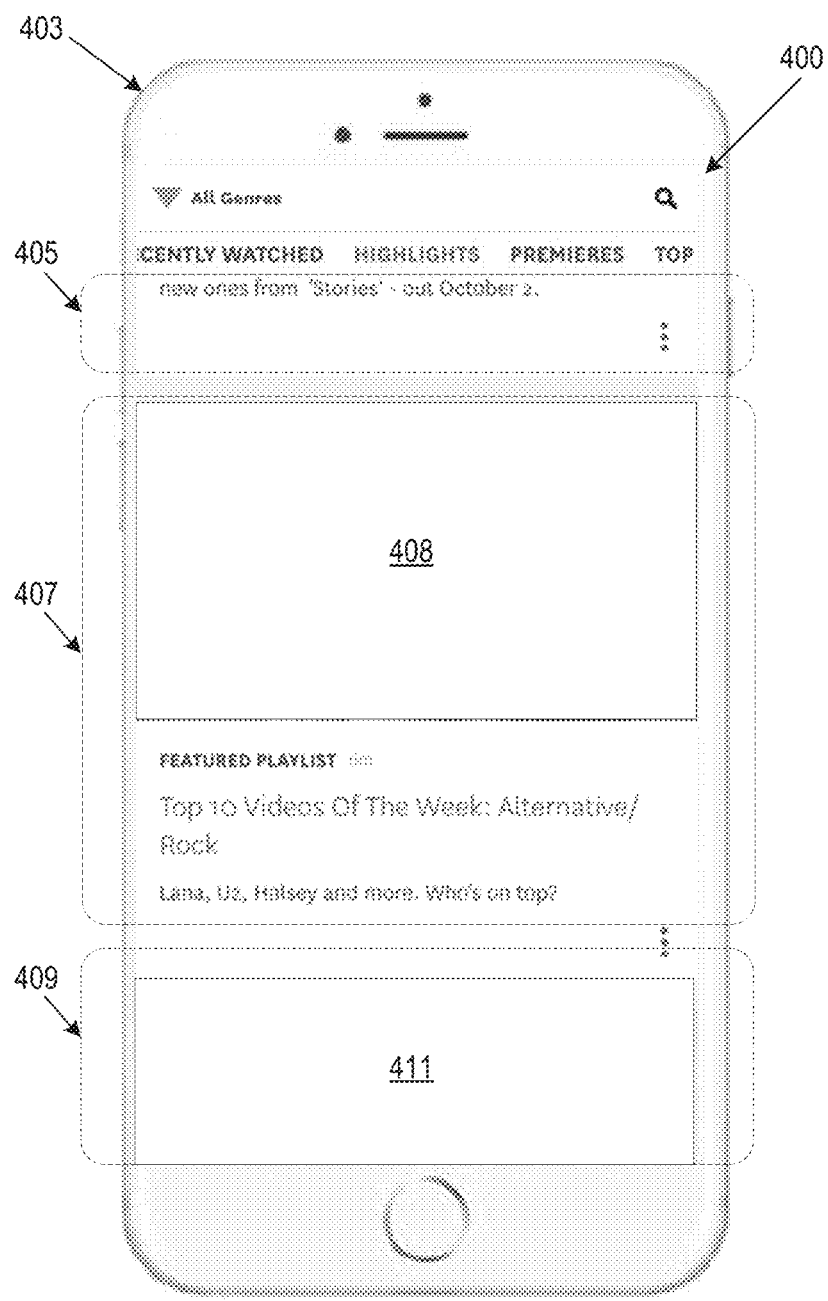
FIG. 4 depicts an example scrollable set of content items scrolling in the same scrolling direction of a content feed, in accordance with one implementation of the present disclosure.

At block 320, the processing device renders the user interface on the user device and displays the set of content items in the user interface (e.g., in a content feed). The set of content items can be a scrollable set of items that includes a scrollable group of videos (e.g., presented as a video carousel). A scrollable group of videos can include two or more videos. A scrollable set of content items can be part of a content feed. In one example, the scrollable set of content items scrolls in the same orientation in which the content feed scrolls. FIG. 4 depicts an example scrollable set of content items scrolling in the same scrolling direction as a presentation of a content feed, in accordance with one implementation of the present disclosure. A user interface 400 of an application can be rendered in a user device 403. The application may be a mobile application of a content provider that is a video hosting service provider "XYZ123" via a content provider platform (e.g., content provider platform 297 in FIG. 2). The user interface 400 can present a content feed that lists feed item 405, feed item 407, and feed item 409. Video 408 and video 411 may be video advertisements from the same advertiser or from different advertisers.

The user interface 400 can have the same orientation as the user device 403. For example, the user device 403 may be in a portrait orientation and the user interface can also be in a portrait orientation. The content feed can be scrollable in a direction that is parallel to an orientation of the user interface 400. For example, the user interface 400 may be in a portrait orientation and the content feed can be scrolled in a vertical direction, from the top of the user interface 400 to the bottom of the user interface 400, and/or from the bottom to the top of the user interface 400. Feed item 407 can include a video 408, which is currently fully visible in user interface 400. Feed item 409 can include a video 411, which is currently partially visible in user interface 400. The scrollable set of content items can include video 408 and video 411, which scroll in the same orientation in which the content feed scrolls.

Figure 5:
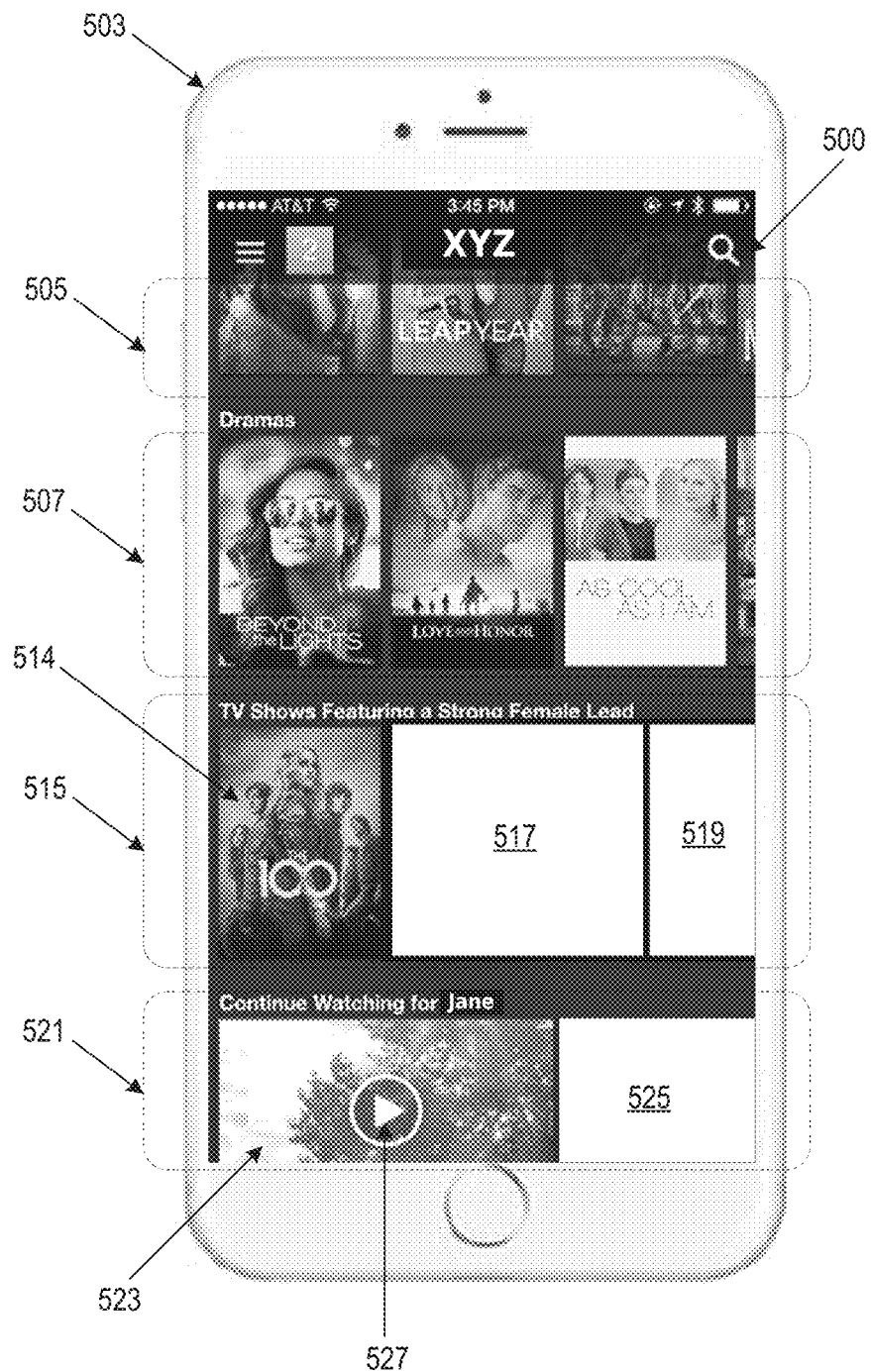
FIG. 5 depicts an example scrollable set of content items scrolling in a direction that is perpendicular to the scrolling direction of a content feed, in accordance with one implementation of the present disclosure.

In another example, the scrollable set of content items scrolls in a direction that is perpendicular to the scrolling direction of the content feed. FIG. 5 depicts an example scrollable set of content items scrolling in a direction that is perpendicular to the scrolling direction of a content feed, in accordance with one implementation of the present disclosure. A user interface 500 of an application can be rendered in a user device 503. The application may be a mobile application of a content provider, "ABCDE," that is a service provider for on-demand Internet streaming media via a content provider platform (e.g., content provider platform 297 in FIG. 2). The user interface 500 can present a content feed that lists feed items, such as, a scrollable set 505 of thumbnails representing television shows that are currently trending, a scrollable set 507 of thumbnails representing television drama shows, a scrollable set 515 of videos (e.g., video 517 and video 519) that also includes a thumbnail 514 representing a television show that has a strong female lead, and a scrollable set 521 of videos that includes a thumbnail 523 representing a video of a show that a user (e.g., Jane) has stopped watching, and a video 525. Video 517, video 519 and video 525 may be video advertisements from the same advertiser or from different advertisers.

The user interface 500 can have the same portrait orientation as the user device 503. The content feed can be scrollable in a vertical direction, which is parallel to the vertical orientation of the user interface 500. A user can swipe the content feed vertically from the bottom of the user interface 500 to top of the user interface 500, and/or in a top to bottom direction to present different items of the content feed in the user interface 500. The scrollable sets (e.g., set 515 and set 521) of videos can scroll horizontally, which is perpendicular to the vertical scrolling direction of the content feed. A user can swipe a scrollable set (e.g., set 515 and set 521) of videos from the right of the user interface 500 to left of the user interface 500, and/or in a left to right direction to present different items of the respective scrollable set of content items in the user interface 500.

In another example, a user device may be in a landscape orientation and a user interface can have the same orientation as the user device. The content feed may be presented in the user interface to allow a user to scroll through the content feed in a horizontal direction. The scrollable sets of videos in the content feed may be scrollable in a vertical direction, which is perpendicular to the scrolling direction of the content feed. A user can swipe the content feed horizontally from the right of the user interface to the left of the user interface, and/or from the left to right of the user interface to present different items of the content feed in the user interface. A user can swipe a scrollable set of content items vertically from a top of a user interface to the bottom of the user interface, and/or from the bottom to top of the user interface to present different items of the respective scrollable set of content items in the user interface.

Referring to FIG. 3, at block 330, the processing device plays one video of the set of content items in the user interface. In one implementation, the processing device plays a video that is fully visible in the user interface. For example, referring to FIG. 4, the processing device may play video 408 when the video 408 is fully visible in the user interface 400. In one implementation, the processing device automatically starts playing the video when the video becomes fully visible in the user interface. In one implementation, the processing device displays a thumbnail representation of the video and then plays the video based on user input. The processing device can start playing a video when user input is received to request the playing of the video. For example, a user may touch the thumbnail representation and/or a user interface (UI) element that is displayed in the user interface for triggering the processing device to play a corresponding video. Referring to FIG. 5, a user can select UI element 527 to trigger the processing device to play the video being represented by thumbnail 523.

Figure 6:
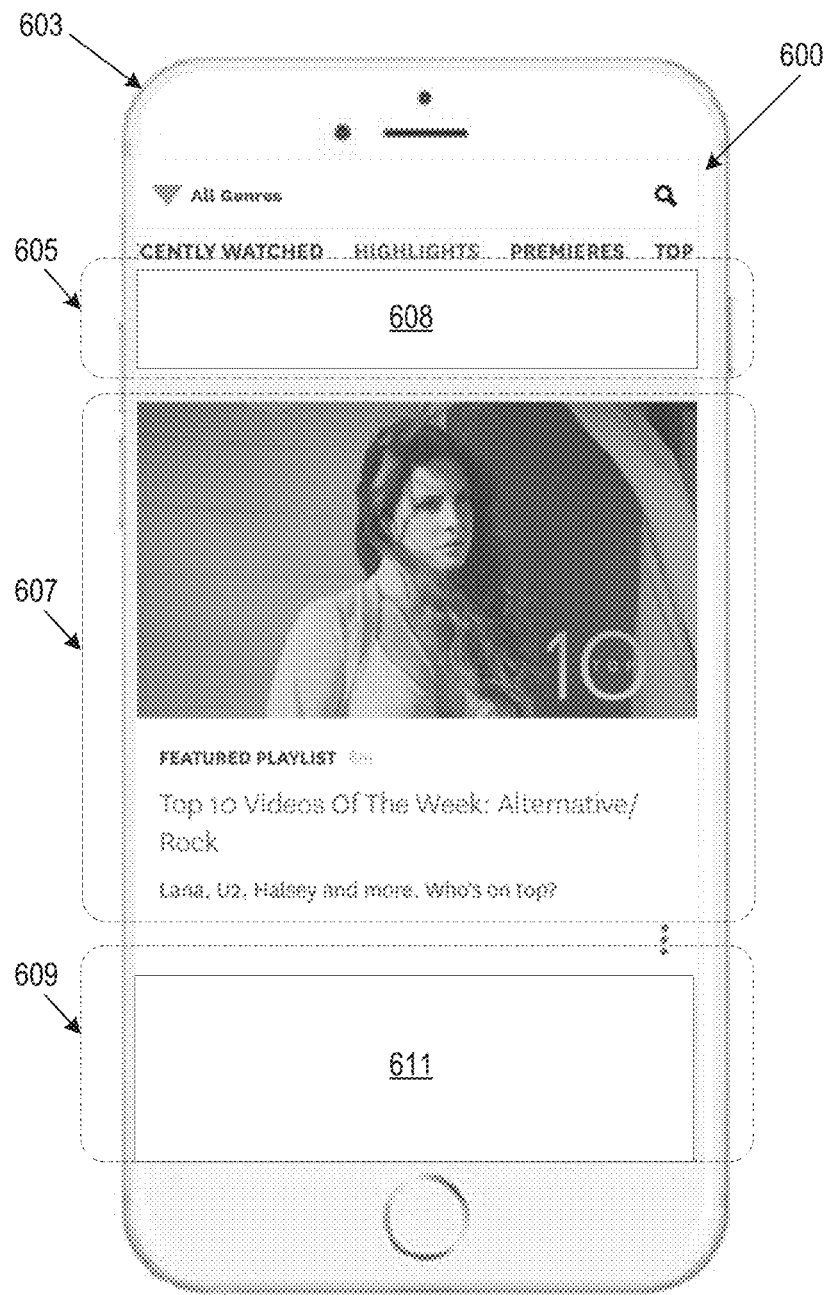
FIG. 6 depicts examples of partially visible videos in a scrollable set of content items, in accordance with one implementation of the present disclosure.

Referring to FIG. 3, at block 330, in one implementation, the processing device plays a video that is partially visible in the user interface. FIG. 6 depicts examples of partially visible videos in a scrollable set of content items, in accordance with one implementation of the present disclosure. A user interface 600 of an application can be rendered in a user device 603. The application may be a mobile application of a content provider "XYZ123" that is a video hosting service provider via a content provider platform (e.g., content provider platform 297 in FIG. 2). The user interface 600 can present a content feed that lists feed item 605, feed item 607, and feed item 609. The set of content items can include video 608 and video 611. Video 608 and video 611 may be video advertisements from the same advertiser or from different advertisers. The processing device can play video 608 that is partially visible in the user interface 600.

Referring to FIG. 3, at block 340, the processing device starts playing one or more other videos from the set of content items that are partially visible in the user interface and concurrently with the currently playing video (referenced at block 330) in the user interface. In one implementation, the processing device plays a video that immediately follows the currently playing video in the ordered set of content items. For example, referring to FIG. 4, the processing device may select to play video 411 while video 411 is partially visible in the user interface 400 and concurrently with video 408 that is playing while being fully visible in the user interface. In another example, referring to FIG. 5, a user may select UI element 527 to trigger the processing device to play the video being represented by thumbnail 523. The processing device can play video 525 while video 525 is partially visible in the user interface 500 and concurrently with the video, which was triggered by UI elements 527, that is playing while being fully visible in the user interface 500. In another example, referring to FIG. 6, the processing device may play video 611 while video 611 is partially visible in the user interface 600 and concurrently with video 608 that is playing while being partially visible in the user interface.

Figure 7:
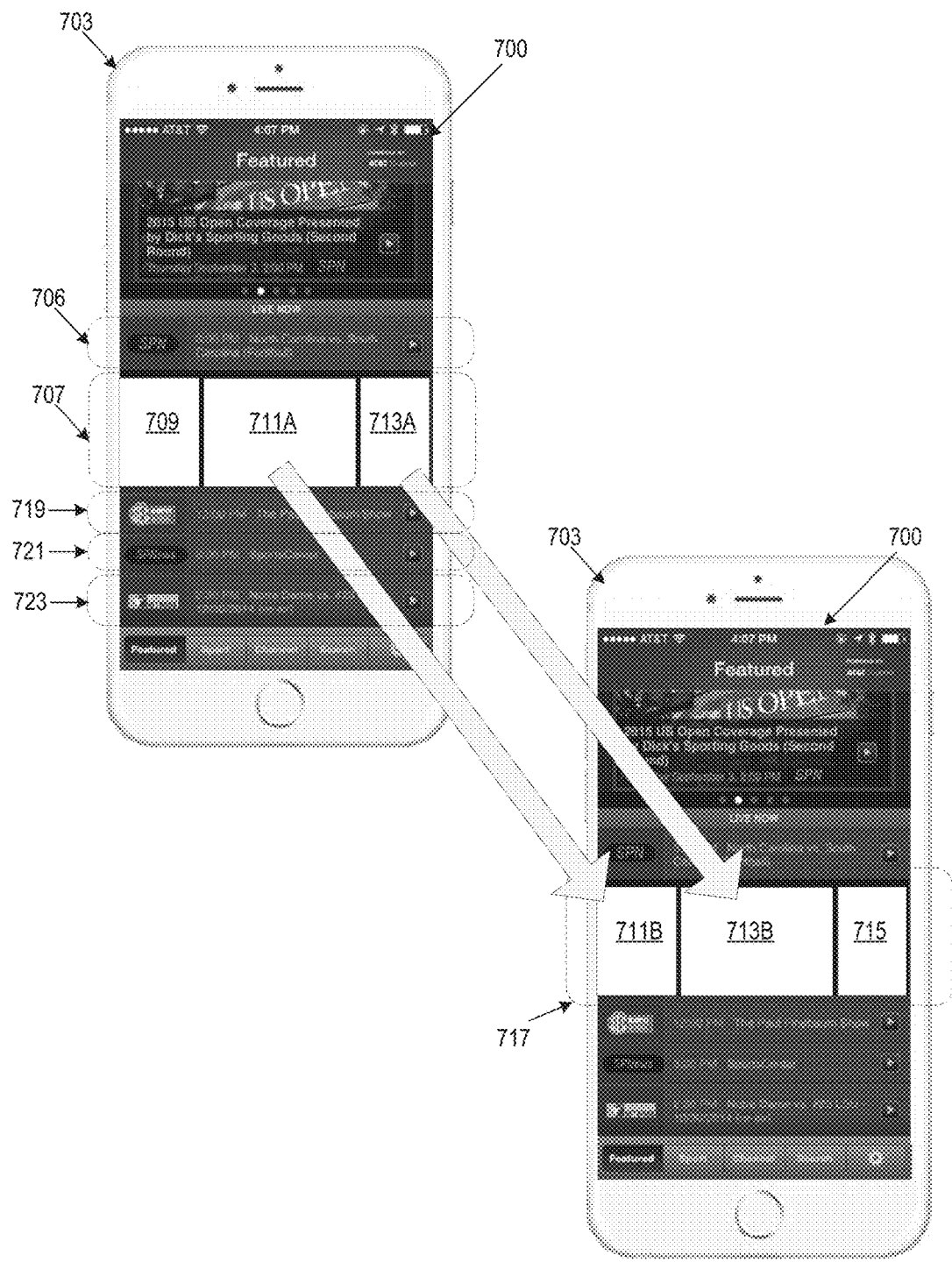
FIG. 7 depicts an example of a partially visible video transitioning to a fully visible video, in accordance with one implementation of the present disclosure.

Referring to FIG. 3, at block 350, the processing device may receive user input to transition one of the one or more partially visible videos into a fully visible video in the user interface. A partially visible video can transition into a fully visible video based on a trigger. The trigger can occur, for example, when a fully visible video finishes playing, when a user swipes the scrollable set of content items, and when a user selects a partially visible video. FIG. 7 depicts an example of a partially visible video transitioning to a fully visible video, in accordance with one implementation of the present disclosure. A user interface 700 of an application can be rendered in a user device 703. The application may be a mobile application of a content provider, "SPN," that is a service provider for on-demand Internet streaming media via a content provider platform (e.g., content provider platform 297 in FIG. 2). The user interface 700 can present a content feed that lists feed items, such as information 706 for an upcoming sports event, a scrollable set 707 of content items, and information 719, 721, 723 for other upcoming sports events. The scrollable set 707 of content items includes a partially visible video 709, a fully visible video 711A, and another partially visible video 713A.

In one implementation, for example, when fully visible video 711A finishes playing, the processing device automatically performs an animation to position the partially visible video 713A as fully visible video 713B in the user interface 700. The processing device can automatically perform an animation to illustrate the scrolling of the scrollable set 707 of content items and render a different presentation 717 of the scrollable set of content items. The processing device can automatically perform an animation to illustrate the scrolling to the partially visible video 713A in the user interface 700, and causing video 713B to become fully visible in the user interface 700. For example, the animation can move the scrollable set of content items from right to left, to change the position of the partially visible video 713A such that the partially visible video 713A becomes a fully visible video 713B in the user interface 700. The animation can also move the scrollable set of content items, for example, from right to left, to change the position of the fully visible video 711A such that the fully visible video 711A becomes partially visible video 711B in the user interface 700.

In one implementation, when a partially visible video transitions into a fully visible video in the user interface, the video continues to play while fully visible. For example, partially visible video 713A may be playing while partially visible, and then may transition to fully visible video 713B and continue playing while fully visible. In one implementation, when a partially visible video transitions into a fully visible video in the user interface, the video can automatically restart playing from the beginning of the video when the video becomes fully visible. For example, partially visible video 713A may be playing while partially visible and then may transition to fully visible video 713B and restart playing from the beginning when the video becomes fully visible. In one implementation, when a partially visible video transitions into a fully visible video in the user interface, the audio of the video is enabled. For example, partially visible video 713A may be disabled while playing as partially visible, and may then transition to fully visible video 713B and play with the audio enabled.

Figure 8:
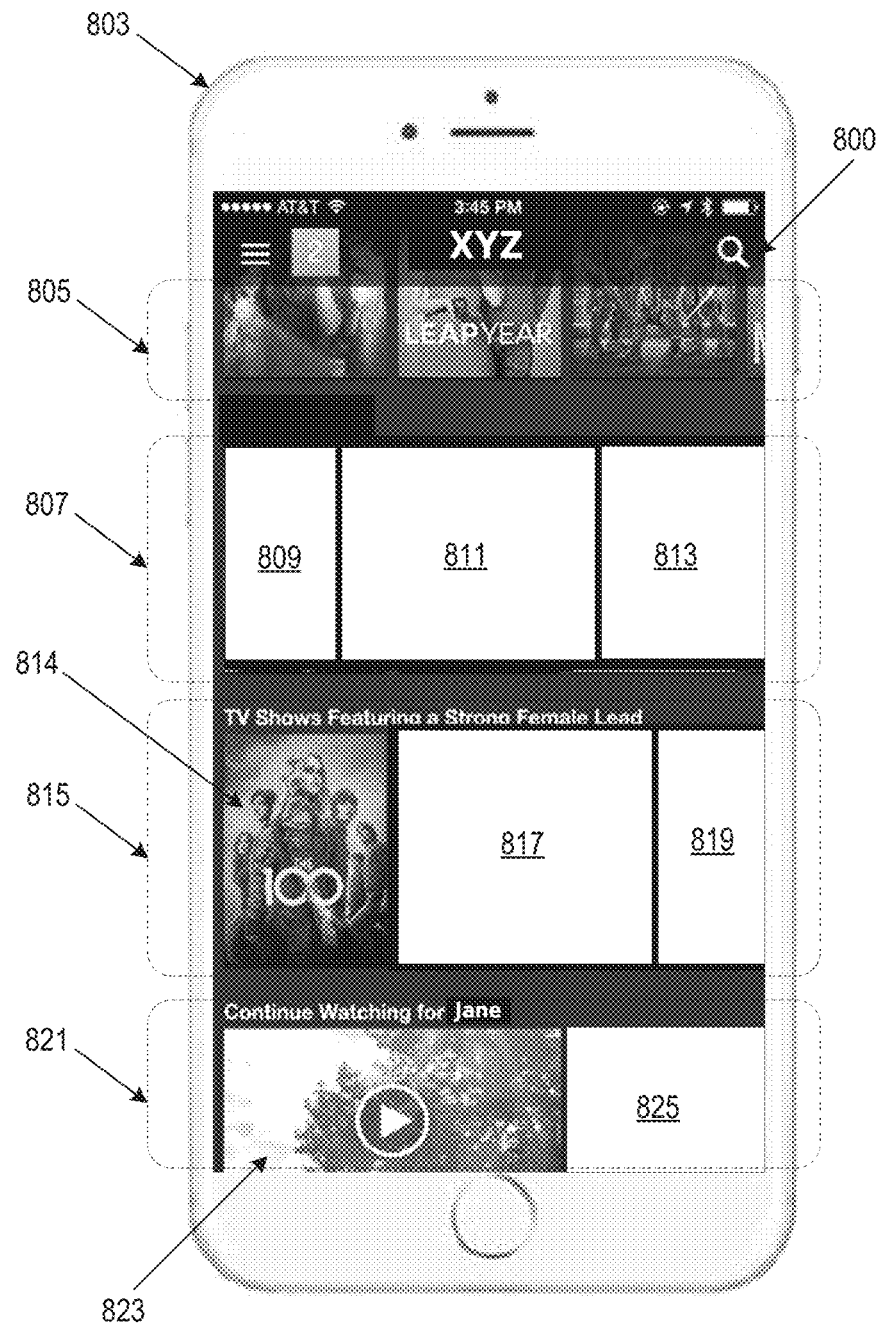
FIG. 8 depicts examples of scrollable sets of content items, in accordance with one implementation of the present disclosure.

FIG. 8 depicts examples of scrollable sets of content items, in accordance with one implementation of the present disclosure. The content items can include videos, thumbnails, images, text and combinations of such. A user interface 800 of an application can be rendered in a user device 803. The application may be a mobile application of content provider, "XYZ," which is a service provider for on-demand Internet streaming media via a content provider platform (e.g., content provider platform 297 in FIG. 2). The user interface 800 can present a content feed that lists feed items, such as a scrollable set of thumbnails and/or one or more scrollable sets of videos. For example, the scrollable set 805 of content items includes thumbnails representing television shows that are currently trending. In another example, the scrollable set 815 of content items includes video 817, video 819, and a thumbnail 814 representing a television show that has a strong female lead. In yet another example, the scrollable set 821 of content items includes a video being represented by thumbnail 823 of a show that a user (e.g., Jane) has stopped watching, and another video 825. Video 809, video 811, video 813, video 817, video 819 and video 825 may be video advertisements from the same advertiser or from different advertisers.

In one implementation, all of the items in a scrollable set of content items are videos. For example, the scrollable set 807 of content items is a scrollable set of videos that includes video 809, video 811 and video 813. In FIG. 1, FIGS. 4-8, and FIG. 10, one or more other videos that are not visible in a user interface (e.g., user interface 800) may be part of a scrollable set of content items (e.g., scrollable set of videos).

In one implementation, one or more items in a scrollable set of content items are an image, thumbnail, and/or text. The images, thumbnails and/or text can be positioned between videos, before a video, and/or after a video in the scrollable set of content items. For example, the scrollable set 815 of content items includes a thumbnail 814 of an image and has the thumbnail 814 positioned next to a video 817 in the scrollable set 815 of content items. In another example, the scrollable set 821 of content items includes a thumbnail 823, which represents a video, and is positioned next to video 825 in the scrollable set 821 of content items.

In one implementation, all of the videos in a scrollable set of content items are video advertisements for which an advertiser may be charged a fee for, and are from the same advertiser. For example, video 809, video 811 and video 813 may be video advertisements for the same advertiser, Advertiser-A. In one implementation, all of the videos in a scrollable set of content items are video advertisements, and are from at least two different advertisers. For example, video 809 may be an advertisement for a car for Advertiser-A, and video 811 and video 813 may be video advertisements for cars for a different advertiser, Advertiser-B.

In another implementation, at least one of the videos in the scrollable set of content items is not a video advertisement. For example, the scrollable set 815 of content items includes video 819, which may be a video advertisement, and video 817, which may not be a video advertisement (e.g., video 817 may be a primary content video such as a movie clip, a TV show, etc.).

In one implementation, a video is played without audio. In one implementation, the audio of a video is disabled. For example, the audio of a video can be muted. One or more partially visible videos can be played with or without audio. In one implementation, one or more partially visible videos are automatically played without audio. One or more fully visible videos can be played with or without audio. In one implementation, if more than one fully visible video is being played in a user interface, the fully visible videos are played without audio. For example, video 811 and video 817 may be displayed as fully visible at the same time in the user interface 800. Processing device can automatically play video 811 and video 817 concurrently without audio. In one implementation, the audio for a video that is playing can be enabled based on user input. For example, a user can select one or more videos (e.g., video 811 or video 817) to enable the audio for the selected video(s).

In one implementation, one or more partially visible videos can be played while one or more fully visible videos are being represented by a thumbnail and not yet played. For example, partially visible video 825 can be played when the thumbnail 823 is displayed and the video being represented by the thumbnail 823 is not yet played. In another implementation, a partially visible video can be played concurrently with one or more fully visible videos playing. For example, partially visible video 809 and/or partially visible video 813 can be played concurrently with one or more fully visible videos (e.g., video 811, video 817) playing.

The processing device can automatically play (auto-play) a video based on a trigger. Different triggers or the same triggers can be applied to different content providers (e.g., advertisers). Different triggers or the same triggers can be applied to the same content provider. Different triggers or the same triggers can be applied to different videos. The trigger can include one or more video parameters that specify the type of other video that should be used to trigger the playing of a next video. The video parameters can specify, for example, whether a video is triggered to auto-play by another video that is in the same set of content items, by another video that is from the same content provider (e.g., advertiser), by another video that is fully visible in a user interface, and/or by another video that is partially visible in the user interface.

In one implementation, videos (e.g., partially visible videos) may only be triggered for auto-play based on a video that is part of the same scrollable set of content items and currently visible (e.g., partially visible, fully visible) in the user interface. For example, video 809, video 811, and video 813 are included in the same scrollable set 807 of content items. The auto-play of partially visible video 809 may only be triggered by fully visible video 811 and/or partially visible video 813. The auto-play of partially visible video 813 may only be triggered by fully visible video 811 and/or partially visible video 809. In another example, video 817 and video 819 are included in the same scrollable set 815 of content items, and the auto-play of partially visible video 819 may only be triggered by fully visible video 817. In another example, video being represented by thumbnail 823 and video 825 are included in the same scrollable set 821 of content items, and the auto-play of partially visible video 825 may only be triggered by the fully visible video being represented by thumbnail 823.

In another implementation, a video may be triggered for auto-play based on a video that is part of a different scrollable set of content items and currently visible (e.g., partially visible, fully visible) in the user interface. For example, the auto-play of partially visible video 813 can be triggered by a video in the scrollable set 815 of content items and/or by a video in the scrollable set 821 of content items.

In one implementation, a partially visible video may be triggered for auto-play based only on a fully video. The fully visible video can be part of the same scrollable set of content items and/or part of a different scrollable set of content items. For example, the auto-play of partially visible video 813 can be triggered by fully visible video 811, fully visible video 817 and/or the fully visible video being represented by thumbnail 823.

In one implementation, a video may be triggered for auto-play based on another video that is from the same content provider (e.g., advertiser). The other video can be part of the same scrollable set of content items and/or part of a different scrollable set of content items. For example, video 811, video 813, video 817 and video 825 can be from the same content provider, Advertiser-ABC. The auto-play of any video of video 811, video 813, video 817 and video 825 can be triggered by another video from Advertiser-ABC that is visible in the user interface. For example, the auto-play of partially visible video 813 can be triggered by video 811, video 817 and/or video 825.

In one implementation, the trigger for a certain video is not based on another video but rather on some properties of the certain video. For example, the trigger may specify that a video should be played once a portion of the video is visible in the user interface.

The trigger can include one or more time parameters. The individual time parameters can specify a time period. The time period can be configurable and/or user defined. In one example, the time period specifies a period of time during which at least a portion of a video should be visible in a user interface. For example, the trigger to auto-play the partially visible video 813 may occur when at least a portion of the partially visible video 813 has been visible for a particular time period (e.g., 3 seconds).

In one example, the time period specifies a period of time during which a thumbnail (e.g., thumbnail 823), that represents a video, is displayed. For example, the trigger to auto-play a video (e.g., partially visible video 825) may occur when a thumbnail (e.g., thumbnail 823) for a video has been displayed for a particular time period (e.g., 3 seconds). For example, a thumbnail 823 is being displayed in the user interface 800 and the fully visible video corresponding to the thumbnail 823 is not yet played. When the processing device detects that the thumbnail 823 has been displayed for example, for 3 seconds, the processing device can automatically start playing another video (e.g., partially visible video 825). The time period can be configurable and/or user defined.

The time parameter can specify a period of time during which a video has played. For example, the trigger to auto-play a video (e.g., partially visible video 813) may occur when another video (e.g., fully visible video, partially visible video) has played for a particular time period (e.g., 5 seconds). For example, when the processing device detects that a fully visible video 811 has played for 5 seconds, the processing can automatically start playing partially visible video 813.

The time parameter can specify a period of time preceding the ending of a video that is currently playing. For example, the trigger to auto-play a video may be a particular time period prior to another video ending its play. For example, the particular time period may be 5 seconds. Individual videos have a length of time. For example, video 817 may have a length of time of 30 seconds. When the processing device detects that the video 817 has played for 25 seconds, which is 5 seconds prior to the ending of the length of time for the video 817, the processing device can automatically start playing another video (e.g., partially visible video 819).

The trigger can specify that a video should start playing when another video reaches its end. For example, fully visible video 817 may be playing may have a length of time of 30 seconds. The processing device can automatically play another video (e.g., partially visible video 813) when the fully visible video 817 finishes playing its length of time of 30 seconds.

The trigger can specify that a video should start playing when another video is paused or stopped. A video can be paused or stopped based on input (e.g., user input) that is received, for example, by a touch of the display (e.g., touch screen) or by a selection of a UI element in a GUI for pausing or stopping a video. For example, the fully visible video 811 may be playing, and a user may touch the fully visible video 811 to pause the playing of the fully visible video 811. The processing device can detect that the fully visible video 811 is paused and can automatically start playing another video (e.g., partially visible video 813).

The trigger can specify that a video should start playing when user input is received to scroll the set of content items. The user input can be a swiping gesture with respect to the set of content items. For example, the processing device may detect a user swiping the set 821 of videos from right to left and may automatically play the partially visible video 825.

Figure 9:
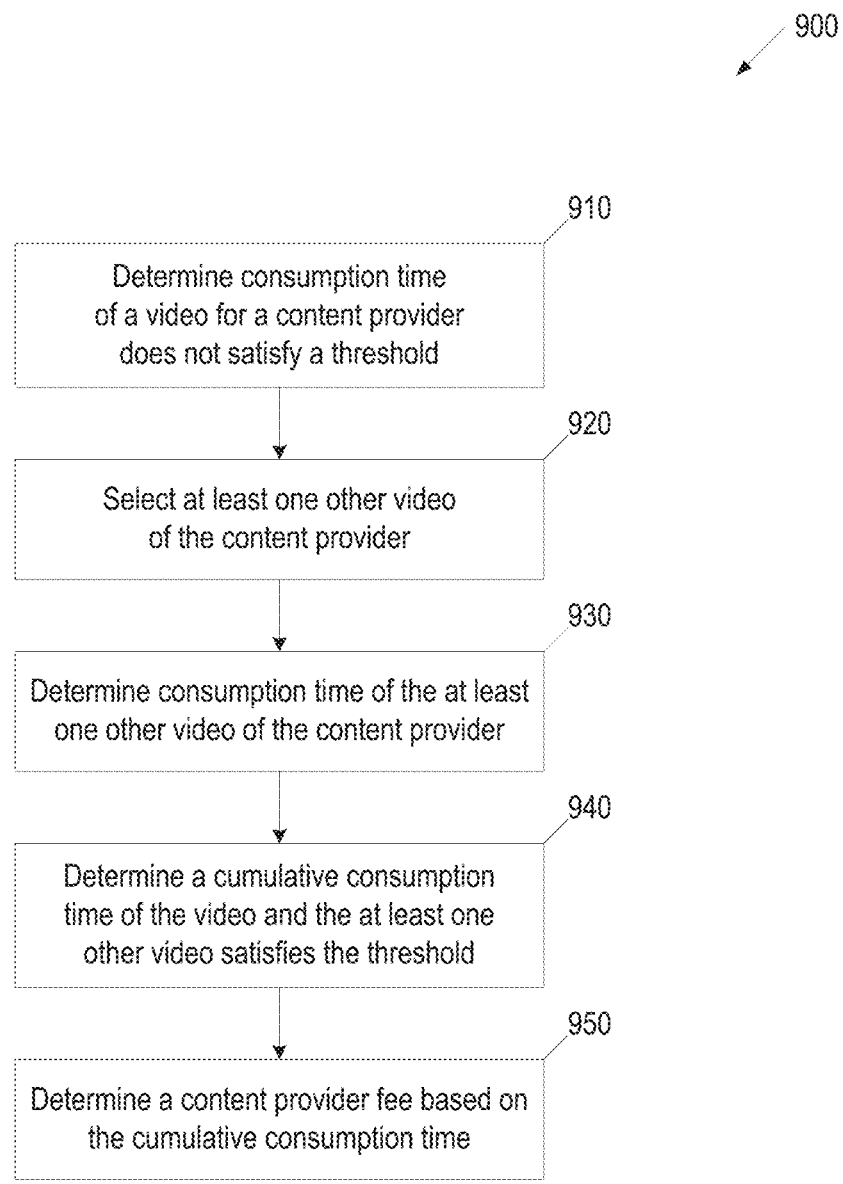
FIG. 9 depicts a flow diagram of aspects of a method for determining a content provider fee based on a cumulative consumption time, in accordance with one implementation of the present disclosure.

FIG. 9 depicts a flow diagram of aspects of a method 900 for determining a content provider fee based on a cumulative consumption time, in accordance with one implementation of the present disclosure. The method 900 is performed by processing logic that may comprise hardware (circuitry, dedicated logic, etc.), software (such as is run on a general purpose computer system or a dedicated machine), or a combination of both. In one implementation, the method is performed by a cumulative-fee based component 240 in a server 230 and/or a cumulative-fee based component 240 in an advertisement platform 265 of FIG. 2. In one implementation, a processing device of a server performs method 900.

At block 910, the processing device determines that consumption time of a video for a content provider does not satisfy a threshold. The content provider can be a particular advertiser and the video can be a video advertisement associated with the particular advertiser. The threshold can be a billing threshold that specifies a minimum amount of consumption time associated with charging the content provider (e.g., advertiser) a content provider fee. The billing threshold can be compared with a cumulative consumption time of one or more instances of playing a video of the advertiser and/or playing multiple videos of the advertiser. The billing threshold can be configurable and/or user-defined. The billing threshold can be stored in a data store.

The processing device can determine the consumption time for the video based on one or more logs that can be received, for example, from one or more communication applications (e.g., communication application 215 in FIG. 2). In one implementation, the logs indicate consumption time only for a video that is played while being fully visible in a user interface. In another implementation, the logs indicate consumption time for a video that is played while being fully visible in a user interface and partially visible in a user interface. The logs can be received from different communication applications on different user devices. The logs can be stored in one or more data store (e.g., data store 206 in FIG. 2) and accessible to the cumulative-fee based component.

For example, referring to FIG. 2, the cumulative-fee based component 240 can receive logs for videos from communication application 215 on user device 210A and from communication application 215 on user device 210Z. Each log can include, for example, a video identifier, a content provider identifier, an instance identifier, a communication application identifier, a user device identifier, and/or a time-stamp for sending the respective log. In one implementation, while an instance (e.g., Instance Z) of video (e.g., Video X) is being played on a device (e.g., Device Y), a communication application on Device Y can send a log for the Video X according to a schedule (e.g., every 2 seconds) to the cumulative-fee based component until the video (e.g., Video X) is no longer playing. For example, Video X can start playing on Device Y and the communication application can send a log to the cumulative-fee based component every 2 seconds until Video X is no longer playing. If the cumulative-fee based component receives 2 logs for Video X for Instance Z on Device Y, and does not receive any other logs for Video X for Instance Z on Device Y, the cumulative-fee based component can determine that the consumption time for Video X for Instance Z on Device Y is at least 4 seconds.

In one implementation, the billing threshold is applied to consumption time per device for a particular video of an advertiser. The billing threshold can specify an amount of consumption time that should be satisfied from one or more instances of consuming the video of the advertiser by an individual device before charging the advertiser a fee. For example, the cumulative-fee based component can use one or more identifiers in the logs from a particular device (e.g., user device 210A in FIG. 2) to determine consumption time for Video X of Advertiser-ABC playing on Device Y, and determine whether the consumption time for Video X of Advertiser-ABC playing on Device Y satisfies the billing threshold.

In another implementation, the billing threshold is applied to consumption time for a particular video of an advertiser across multiples devices. For example, the cumulative-fee based component can use one or more identifiers in the logs from multiple devices (e.g., Device Y, Device M, and Device N) to determine consumption time for Video X of Advertiser-ABC playing on Device Y, Device M, and Device N, and determine whether the consumption time for Video X of Advertiser-ABC playing on Device Y, Device M, and Device N satisfies the billing threshold.

In one implementation, the billing threshold can be associated with a time period. The billing threshold can specify an amount of consumption time that should be satisfied within the time period before charging an advertiser a fee. The time period is configurable and/or user-defined. The time period can be a rolling time period (e.g., the last 1 hour). The time period can be a particular time (e.g., 3:00 pm to 4:00 pm). A time period parameter can be stored in a data store (e.g., data store 206 in FIG. 2). For example, the time period may be the last 1 hour relative to the current time, and the processing device can use the logs received from one or more user devices for the last hour to determine the consumption time for the video for the last hour. The processing device can determine whether the consumption time for the video for the last hour satisfies the billing threshold.

Referring to FIG. 9, at block 910, the processing device may locate 2 logs for Video X for Instance Z on Device Y. The processing device may determine from the logs that each log is scheduled to be sent every 2 seconds, and the processing device can determine that the consumption time for Video X for Instance Z on Device Y is at least 4 seconds. The billing threshold can be stored in a data store. The billing threshold may be 15 seconds. For example, a content provider should not be charged a fee unless the billing threshold of 15 seconds is satisfied. The processing device may determine that the consumption time for Video X for Instance Z on Device Y is at least 4 seconds and does not satisfy the threshold of 15 seconds.

At block 920, the processing device selects at least one other video of the content provider (e.g., advertiser). The processing device can select a video based on one or more selection criteria. The selection criteria can be stored in a data store. The selection criteria can be configurable and/or user-defined. The selection criteria can be assigned to a particular content provider. The selection criteria may specify whether the selected video should be from the same scrollable set of content items and/or from a different scrollable set of content items, another instance of the same video, an instance of a different video from the same content provider, a video that is played on the same user device and/or a different user device, and/or a video that is played within a particular time and/or time period (e.g., within an hour).

Figure 10:
FIG. 10 depicts examples of scrollable sets of videos, in accordance with one implementation of the present disclosure.

FIG. 10 depicts examples of scrollable sets of videos, in accordance with one implementation of the present disclosure. A user interface 1000 of an application can be rendered in a user device 1003. The application may be a mobile application of a content provider that is a service provider for on-demand Internet streaming media via a content provider platform (e.g., content provider platform 297 in FIG. 2). The user interface 1000 can present a content feed that lists feed items, such as, thumbnails of videos that a user can continue to watch, thumbnails of videos of television shows that have been recently added by the service provider, and thumbnails of videos of movies that have been recently added by the service provider. The content feed can include a scrollable set 1007 of videos, which includes a fully visible video 1004, a partially visible video 1005, and thumbnails of videos that a user can continue to watch. The content feed can also include a scrollable set 1009 of videos, which includes a fully visible video 1011, a partially visible video 1013, and thumbnails representing movie videos that have been recently added by the service provider. In one implementation, the videos belonging to the same scrollable set of content items may be from the same advertiser. For example, video 1004 and video 1005 are videos of the same advertiser, Advertiser-A. In another implementation, the videos belonging to the same scrollable set of content items are from different advertisers. For example, video 1004 is from Advertiser-A, and video 1005 is from Advertiser-B.

Referring to FIG. 9, at block 910, the processing device may have determined that the consumption time for playing an instance of video 1004 in scrollable set 1007 of videos on device 1003 is at least 4 seconds. At block 920, for example, the selection criteria may specify that the processing device should select a video from the same scrollable set of content items, and the processing device may select video 1005 from the scrollable set 1007 of videos.

The processing device can select a video to satisfy the selection criteria using one or more identifiers in the logs. The logs for the videos can include a scrollable set identifier, a video identifier, a content provider identifier, an instance identifier, a communication application identifier, a user device identifier, and/or a timestamp for sending the respective log. The processing device can locate logs, which have matching scrollable set identifiers, to determine which videos belong to the same scrollable set of content items and may select another video from the same scrollable set of content items.

At block 930, the processing device determines consumption time of the at least one other video of the content provider (e.g., advertiser). The processing device can use the logs for the at least one video to determine the consumption time. For example, the processing device may determine from the logs for video 1005 that the consumption time for playing an instance of video 1005 on device 1003 is at least 14 seconds.

At block 940, the processing device determines that a cumulative consumption time of the video and the at least one other video satisfies the threshold. In one implementation, the processing device combines the individual consumption times to determine the cumulative consumption time. For example, the processing device combines the 4 seconds consumption time for video 1004 with the 14 seconds consumption time for video 1005 to determine a cumulative consumption time of 18 seconds, which satisfies the billing threshold of 15 seconds.

When a billing threshold is satisfied, a content provider (e.g., advertiser) can be charged a content provider fee. At block 950, the processing device determines a content provider fee based on the cumulative consumption time (e.g., 18 seconds).

Figure 11:
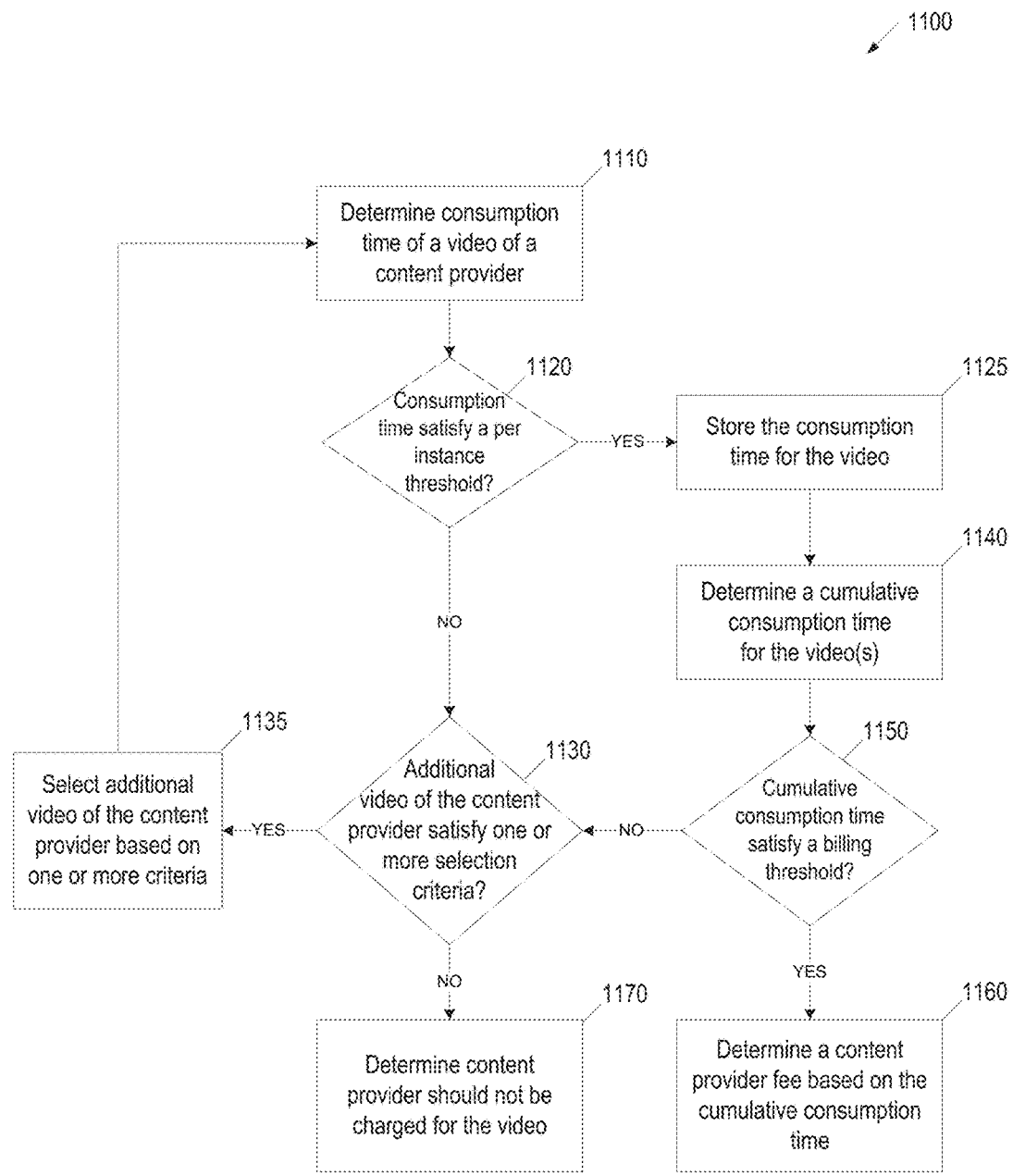
FIG. 11 depicts a flow diagram of aspects of a method for determining a content provider fee based on a cumulative consumption time and multiple thresholds, in accordance with one implementation of the present disclosure.

FIG. 11 depicts a flow diagram of aspects of a method 1100 for determining a content provider fee based on a cumulative consumption time and multiple thresholds, in accordance with one implementation of the present disclosure. The method 1100 is performed by processing logic that may comprise hardware (circuitry, dedicated logic, etc.), software (such as is run on a general purpose computer system or a dedicated machine), or a combination of both. In one implementation, the method is performed by a communication application 215 in a user device 210A-210Z of FIG. 2, while in some other implementations one or more blocks of FIG. 11 may be performed by another machine. For example, in various alternative implementations, at least a portion of the method 1100 can be performed by/at a content sharing component 240 in a server computing machine of FIG. 2. In one implementation, a processing device of a user device (e.g., user device 210A-210Z in FIG. 2) performs method 1100.

At block 1110, the processing device determines consumption time of an instance of playing a video of a content provider. At block 1120, the processing device determines whether the consumption time of the instance of playing the video satisfies a per instance threshold. The per instance threshold can specify an amount (e.g., 3 seconds) of consumption time that should be satisfied by the particular instance of playing the video before considering the consumption time for the particular instance in determining the content provider fee. The per instance threshold can be configurable and/or user-defined. The per instance threshold can be stored in a data store.

If the consumption time does not satisfy the per instance threshold (block 1120), the processing device determines whether there is an additional video of the content provider that satisfies one or more selection criteria (block 1130). The selection criteria can be assigned to a particular content provider. The selection criteria may specify whether the additional video should be from the same scrollable set of content items and/or from a different scrollable set of content items, another instance of the same video, an instance of a different video from the same content provider, a video that is played on the same user device and/or a different user device, and/or a video that is played within a particular time and/or time period (e.g., within an hour).

If the processing device determines there is no additional video that satisfies the one or more selection criteria (block 1130), the processing device determines that the content provider should not be charged for the video at block 1170. The consumption time of the particular instance of the video is ignored and not considered when determining a content provider fee for the content provider (e.g., advertiser) for this particular analysis period. Method 1100 or portions of method 1100 can be iterative based on a frequency of determining a content provider fee for a content provider. A frequency parameter for determining a content provider fee can be stored in configuration data in a data store. The frequency parameter can indicate an analysis period of how often a content provider fee is determined for a content provider. For example, the frequency parameter may indicate that the analysis period is hourly, daily, weekly, at one or more particular times (e.g., 12:00 pm, 12:00 am), etc., and the processing device can perform method 1100 and/or portions of method 1100 hourly, daily, weekly, at one or more particular times (e.g., 12:00 pm, 12:00 am), etc. For example, at block 1170, the processing device may determine that there is no charge for the content provider for that hour, day, or week, etc.

Referring to block 1120, if the consumption time does not satisfy the per instance threshold (block 1120), and if the processing device determines there is an additional video that satisfies the one or more selection criteria (block 1130), then the processing device selects the additional video that that satisfies the one or more selection criteria at block 1135. The processing device may determine that there is more than one video that satisfies the one or more selection criteria at block 1130. The selection criteria can include priority criteria to determine which of the multiple videos to select at block 1135. When another video is selected (block 1135), the processing device returns to block 1110 to determine consumption time of the video.

If the consumption time for an instance of playing a video of an advertiser satisfies the per instance threshold, the processing device stores the consumption in memory (e.g., cache) that is coupled to the processing device at block 1125. At block 1140, the processing device determines a cumulative consumption time for the video. The processing device can use the individual consumption times that are stored in the memory to determine the cumulative consumption time. If there is only one consumption time stored in memory, the processing device uses the single consumption time as the cumulative consumption time. For example, at block 1110, the processing device may determine that the consumption time for an instance of playing a video (e.g., video 1011 in FIG. 10) is 25 seconds, and satisfies the per instance threshold of 3 seconds at block 1120. At block 1140, the processing device can use the consumption time of 25 seconds for video 1011 as the cumulative consumption time at block 1140.

At block 1150, the processing device determines whether the cumulative consumption time (e.g., 25 seconds) satisfies a billing threshold. If the cumulative consumption time satisfies the billing threshold (block 1150), the processing device determines a content provider fee based on the cumulative consumption time at block 1160. For example, the billing threshold may be 15 seconds, and the processing device may determine that the cumulative consumption time of 25 seconds for the instance of playing video 1011 satisfies the billing threshold. The processing device may determine a content provider fee based on the cumulative consumption time (e.g., 25 seconds) at block 1160.

If the cumulative consumption time does not satisfy the billing threshold (block 1150), the processing device determines whether to select another video of the content provider at block 1130 based on criteria, such as selection criteria described in conjunction with FIG. 9. For example, at block 1110, the processing device may determine that a consumption time of a video (e.g., video 1004 in FIG. 10) is 4 seconds, and satisfies the per instance threshold of 3 seconds at block 1120. The processing device can store the consumption time of 4 seconds for video 1004 in memory at block 1125. At block 1140, the processing device can use the consumption time of 4 seconds for video 1004 that is stored in the memory as the cumulative consumption time at block 1140. At block 1150, the processing device may determine that the cumulative consumption time of 4 seconds does not satisfy the billing threshold of 15 seconds. The processing device can determine whether to select another video (e.g., video 1005 in FIG. 10) at block 1130, select the video based on one or more selection criteria and/or priority criteria at block 1135, and may return to block 1110 to determine that the consumption time for video 1005 is 14 seconds. At block 1120, the processing device may determine that the consumption time of 14 seconds for video 1005 satisfies the per instance threshold of 3 seconds, and stores the consumption time of 14 seconds for video 1005 in memory at block 1125. The memory now stores a consumption time of 4 seconds for video 1004 and a consumption time of 14 seconds for video 1005. At block 1140, the processing device can determine the cumulative consumption time for the videos (e.g., video 1004 and video 1005) using the individual consumption times that are stored in the memory. The processing device can determine a sum of the individual consumption times that are stored in the memory. For example, the processing device may determine that the cumulative consumption time is 18 seconds.

At block 1150, the processing device may determine that the cumulative consumption time of 18 seconds satisfies the billing threshold of 15 seconds. In one implementation, the processing device clears the memory (e.g., cache) when the cumulative consumption time satisfies the billing threshold. At block 1160, the processing device determines a content provider fee based on the cumulative consumption time (e.g., 18 seconds).

Figure 12:
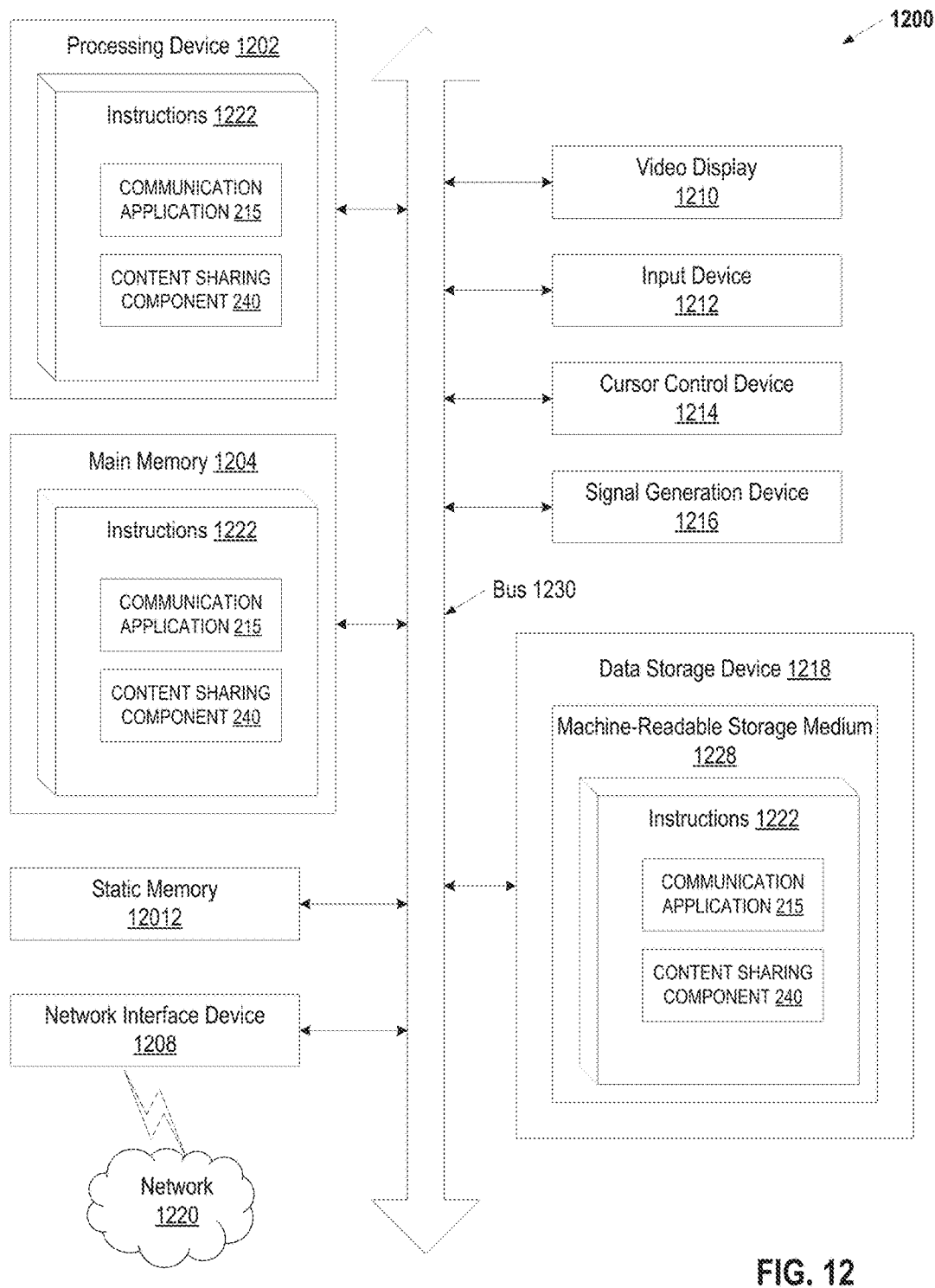
FIG. 12 depicts a block diagram of an example computing device operating in accordance with one or more aspects of the present disclosure.

FIG. 12 illustrates a diagram of a machine in an example form of a computer system 1200 within which a set of instructions, for causing the machine to perform any one or more of the methodologies discussed herein, can be executed, in accordance with one implementation of the present disclosure. The computer system 1200 can be user device 210A-210Z in FIG. 2. The computer system 1200 can be server computing machine in a platform (e.g., content sharing platform 220, recommendation platform 257, promotion platform 265, mobile platform 250, social network platform 260, search platform 245, and collaboration platform 255) in FIG. 2. In alternative implementations, the machine can be connected (e.g., networked) to other machines in a LAN, an intranet, an extranet, or the Internet. The machine can operate in the capacity of a server or a client machine in client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processing device (processor) 1202, a main memory 1204 (e.g., read-only memory (ROM), flash memory, dynamic random access memory (DRAM) such as synchronous DRAM (SDRAM), double data rate (DDR SDRAM), or DRAM (RDRAM), etc.), a static memory 1206 (e.g., flash memory, static random access memory (SRAM), etc.), and a data storage device 1218, which communicate with each other via a bus 1230.

Processor (processing device) 1202 represents one or more general-purpose processing devices such as a microprocessor, central processing unit, or the like. More particularly, the processor 1202 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 can also be one or more special-purpose processing devices such as an application specific integrated circuit (ASIC), a field programmable gate array (FPGA), a digital signal processor (DSP), network processor, or the like. The processor 1202 is configured to execute instructions 1222 for performing the operations and steps discussed herein.

The computer system 1200 can further include a network interface device 1208. The computer system 1200 also can include a video display unit 1210 (e.g., a liquid crystal display (LCD) or a cathode ray tube (CRT)), an input device 1212 (e.g., a keyboard, and alphanumeric keyboard, a motion sensing input device, touch screen), a cursor control device 1214 (e.g., a mouse), and a signal generation device 1216 (e.g., a speaker). The computer system 1200 also can include a camera 1217 to record images that can be stored directly, transmitted to another location, or both. These images can be still photographs or moving images such as videos or movies. The camera 1217 can be a depth aware camera that can capture RGB images along with per-pixel depth information.

The data storage device 1218 can include a non-transitory computer-readable storage medium 1228 on which is stored one or more sets of instructions 1222 (e.g., software) embodying any one or more of the methodologies or functions described herein. The instructions 1222 can also reside, completely or at least partially, within the main memory 1204 and/or within the processor 1202 during execution thereof by the computer system 1200, the main memory 1204 and the processor 1202 also constituting computer-readable storage media. The instructions 1222 can further be transmitted or received over a network 1220 via the network interface device 1208.

In one implementation, the instructions 1222 include instructions for a communication application (e.g., communication application 215 in FIG. 2) and/or a software library containing methods that call the communication application. In one implementation, the instructions 1222 include instructions for a content sharing component (e.g., content sharing component 240 in FIG. 2) and/or a software library containing methods that call the content sharing component. While the computer-readable storage medium 1228 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "rendering", "determining", "selecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A method comprising:
   receiving, by a user device, a plurality of content items comprising a plurality of videos for presentation to a user of the user device;
   rendering a user interface on the user device, wherein the user interface comprises a first video of the plurality of content items that is being played concurrently with a second video of the plurality of content items, and wherein the second video is playing while being partially visible in the user interface;
   determining that a consumption time of the first video that is playing on the user interface does not satisfy a time threshold, wherein the first video is associated with a content provider; and
   responsive to the consumption time of the first video not satisfying the threshold:
      instructing a communication application on the user device to periodically send a log file comprising playback information for at least one other video,
      determining, based on the log, a consumption time of the at least one other video that is associated with the content provider, wherein the consumption time of the at least one other video corresponds to a period when the at least one other video was played while being partially visible on the user interface, determining that a cumulative consumption time of the at least one video and the at least one other video satisfies the time threshold; and responsive to the cumulative consumption time of at least one video and the at least one other video satisfying the threshold:

obtaining configuration data from a data store, the configuration data comprising a charge frequency parameter;

based on the charge frequency parameter and the cumulative consumption time of at least one video and the at least one other video, generating content provider charge data; and transmitting content provider charge data to a content provider computing system.

2. The method of claim 1, wherein the plurality of content items is displayed in a content feed in the user interface, the content feed being scrollable in a first direction parallel to an orientation of the user device, and the plurality of content items being scrollable in the content feed in a second direction that is perpendicular to the first direction of the content feed.

3. The method of claim 1, wherein the first video is playing while being fully visible in the user interface.

4. The method of claim 1, wherein the first video is playing while being partially visible in the user interface.

5. The method of claim 1, further comprising:
rendering the user interface on the user device with an additional video of the plurality of content items, wherein the additional video is playing while being partially visible in the user interface and concurrently with at least one of the first video playing in the user interface or the second video playing in the user interface.

6. The method of claim 1, wherein audio of the second video that is playing while being partially visible in the user interface is disabled, and audio of the first video that is concurrently playing in the user interface is enabled.

7. The method of claim 1, wherein playing of the second video that is partially visible in the user interface is triggered based on the first video.

8. The method of claim 1, wherein at least one video in the plurality of content items is a video advertisement for which an advertiser is to be charged.

9. The method of claim 1, further comprising:
determining a content provider fee for the content provider based on the cumulative consumption time of the at least one video and the at least one other video.

10. The method of claim 9, wherein determining a consumption time of the at least one other video that is associated with the same content provider comprises:
selecting the at least one other video that is associated with the same content provider from a different plurality of content items.

11. A system comprising:
a memory; and
a processing device, coupled to the memory, configured to:
receive a scrollable plurality of content items comprising a plurality of videos for presentation to a user of a user device;
render a user interface on the user device, wherein the user interface comprises a first video of the plurality of content items that is being played concurrently with a second video of the plurality of content items, and wherein the second video is playing while being partially visible in the user interface;

determine that a consumption time of the first video that is playing on the user interface does not satisfy a time threshold, wherein the first video is associated with a content provider;

responsive to the consumption time of the first video not satisfying the threshold:

instruct a communication application on the user device to periodically send a log file comprising playback information for at least one other video, determine, based on the log, a consumption time of the at least one other video that is associated with the content provider, wherein the consumption time of the at least one other video corresponds to a period when the at least one other video was played while being partially visible on the user interface, determine that a cumulative consumption time of the first video and the at least one other video satisfies the time threshold; and responsive to the cumulative consumption time of at least one video and the at least one other video satisfying the threshold:

obtain configuration data from a data store, the configuration data comprising a charge frequency parameter;

based on the charge frequency parameter and the cumulative consumption time of at least one video and the at least one other video, generating content provider charge data; and transmit content provider charge data to a content provider computing system.

12. The system of claim 11, wherein the plurality of content items is displayed in a content feed in the user interface, the content feed being scrollable in a first direction parallel to an orientation of the user device, and the plurality of content items being scrollable in the content feed in a second direction that is perpendicular to the first direction of the content feed.

13. The system of claim 11, wherein the first video is playing while being fully visible in the user interface.

14. The system of claim 13, wherein the first video is playing while being partially visible in the user interface.

15. The system of claim 13, wherein the processing device is further configured to:
render the user interface on the user device with an additional video of the plurality of content items, wherein the additional video is playing while being partially visible in the user interface and concurrently with at least one of the first video playing in the user interface or the second video playing in the user interface.

16. A non-transitory computer readable medium having instructions stored thereon that, when executed by a processing device of a user device, cause the processing device to perform operations comprising:
receiving, by the processing device, a plurality of content items comprising a plurality of videos for presentation to a user of the user device;
rendering a user interface on the user device, wherein the user interface comprises a first video of the plurality of content items that is being played concurrently with a second video of the plurality of content items, and wherein the second video is playing while being partially visible in the user interface;

determining that a consumption time of the first video that is playing on the user interface does not satisfy a time threshold, wherein the first video is associated with a content provider;

responsive to the consumption time of the first video not satisfying the time threshold:
- instructing a communication application on the user device to periodically send a log file comprising playback information for at least one other video,
- determining, based on the log, a consumption time of the at least one other video that is associated with the content provider, wherein the consumption time of the at least one other video corresponds to a period when the at least one other video was played while being partially visible on the user interface,
- determining that a cumulative consumption time of the at least one video and the at least one other video satisfies the time threshold; and
- responsive to the cumulative consumption time of at least one video and the at least one other video satisfying the threshold:
  - obtaining configuration data from a data store, the configuration data comprising a charge frequency parameter;
  - based on the charge frequency parameter and the cumulative consumption time of at least one video and the at least one other video, generating content provider charge data; and
  - transmitting content provider charge data to a content provider computing system.

17. The non-transitory computer readable medium of claim 16, wherein the plurality of content items is displayed in a content feed in the user interface, the content feed being scrollable in a first direction parallel to an orientation of the user device, and the plurality of content items being scrollable in the content feed in a second direction that is perpendicular to the first direction of the content feed.

18. The non-transitory computer readable medium of claim 16, wherein the first video is playing while being fully visible in the user interface.

19. The non-transitory computer readable medium of claim 16, wherein the first video is playing while being partially visible in the user interface.

20. The non-transitory computer readable medium of claim 16, the operations further comprising:
- rendering the user interface on the user device with an additional video of the plurality of content items, wherein the additional video is playing while being partially visible in the user interface and concurrently with at least one of the first video playing in the user interface or the second video playing in the user interface.

* * * * *